UNITED STATES PATENT OFFICE.

STUART GWYNN, OF NEW YORK, N. Y.

IMPROVED SOLUTIONS FOR TREATING VEGETABLE FIBER FOR THE MANUFACTURE OF VEGETABLE PARCHMENT.

Specification forming part of Letters Patent No. 73,322, dated January 14, 1868.

*To all whom it may concern:*

Be it known that I, STUART GWYNN, of the city, county, and State of New York, have invented or discovered two new and useful compositions of matter, to be used consecutively in producing another new composition of matter, for which I shall apply hereafter for a patent, and also for a patent for apparatus and machinery required to be used, in combination with these fluids, in the manufacture of the said composition of matter, which I have named "Vegetable Membrane;" and I do hereby declare that the following is a full, clear, and exact description of the ingredients used in, and of the method of compounding or manufacturing, the said compositions of matter, which I name, respectively, "Transforming - Fluid" and "Neutralizing-Fluid."

The transforming - fluid, called No. 1, is composed of sulphuric acid, nitric acid, hydrochloric acid, and of a saturated solution of sulphate of magnesia. The neutralizing-fluid is composed of crude caustic soda, quicklime, glycerine, and water.

I manufacture the transforming-fluid thus: I make a fully-saturated solution (in water) of sulphate of magnesia. Of this solution I take forty-seven (47) parts, (fluid measure,) and pour into it, in several installments—stirring or agitating well between each—fifty (50) parts (fluid measure) of pure sulphuric acid of 66° strength. Considerable heat is generated during this mixing. The fluid should now be cooled to 60° or 65° Fahrenheit. Then I introduce into it two (2) parts (fluid measure) of pure nitric acid, and one (1) part (fluid measure) pure hydrochloric acid, again stirring or agitating well. After subsidence, pour off or decant the clear liquid from the sediment, and it is fit for use.

I make the neutralizing-fluid thus: Take crude soda and make a hot saturated solution in water thereof. Into this solution I put twenty to fifty (20 to 50) per cent. (depending on its purity) of very caustic—it must be free from carbonization—lime, and agitate or stir the mixture for an hour, at least. I then allow it to deposit the insoluble matters, and test for carbonic acid. If entirely free from this gas in combination, the fluid is in fit condition to have the glycerine added; but if it still contain carbonic acid, more oxide of calcium must be added. When quite free from the carbonic acid, and after all sediment has deposited, I take of this fluid ninety-seven (97) parts, by fluid measure, and three parts of glycerine—such quality as that used to put into gas-meters will do for this purpose—agitate and thoroughly mix the fluids, and the neutralizing-solution is fit for use.

In my future specification for manufacturing the new composition of matter named "vegetable membrane," I will describe the mode of using the said fluids, by means of which I transform cellulose—*i. e.*, vegetable cellular tissue in the form of vegetable felts—into vegetable membrane.

Having thus fully described the composition and mode of manufacture of these fluids, what I claim as my invention or discovery, and desire to secure by Letters Patent, is—

1. The mode of producing the fluids numbered one (1) and two, (2,) substantially as described, to be used consecutively in transforming cellulose into vegetable membrane.

2. Fluid No. 1, produced substantially as described, as a new composition of matter.

3. Fluid No. 2, produced substantially as described, as a new composition of matter.

4. The use of these fluids, produced substantially as described, in combination with machinery and apparatus, hereafter to be patented, for manufacturing cellulose, in the form of vegetable felts, into a new composition of matter, to be patented under the name of "vegetable membrane."

STUART GWYNN.

Witnesses:
F. E. BRADSHAW,
HENRY RANDALL.